Patented June 10, 1952

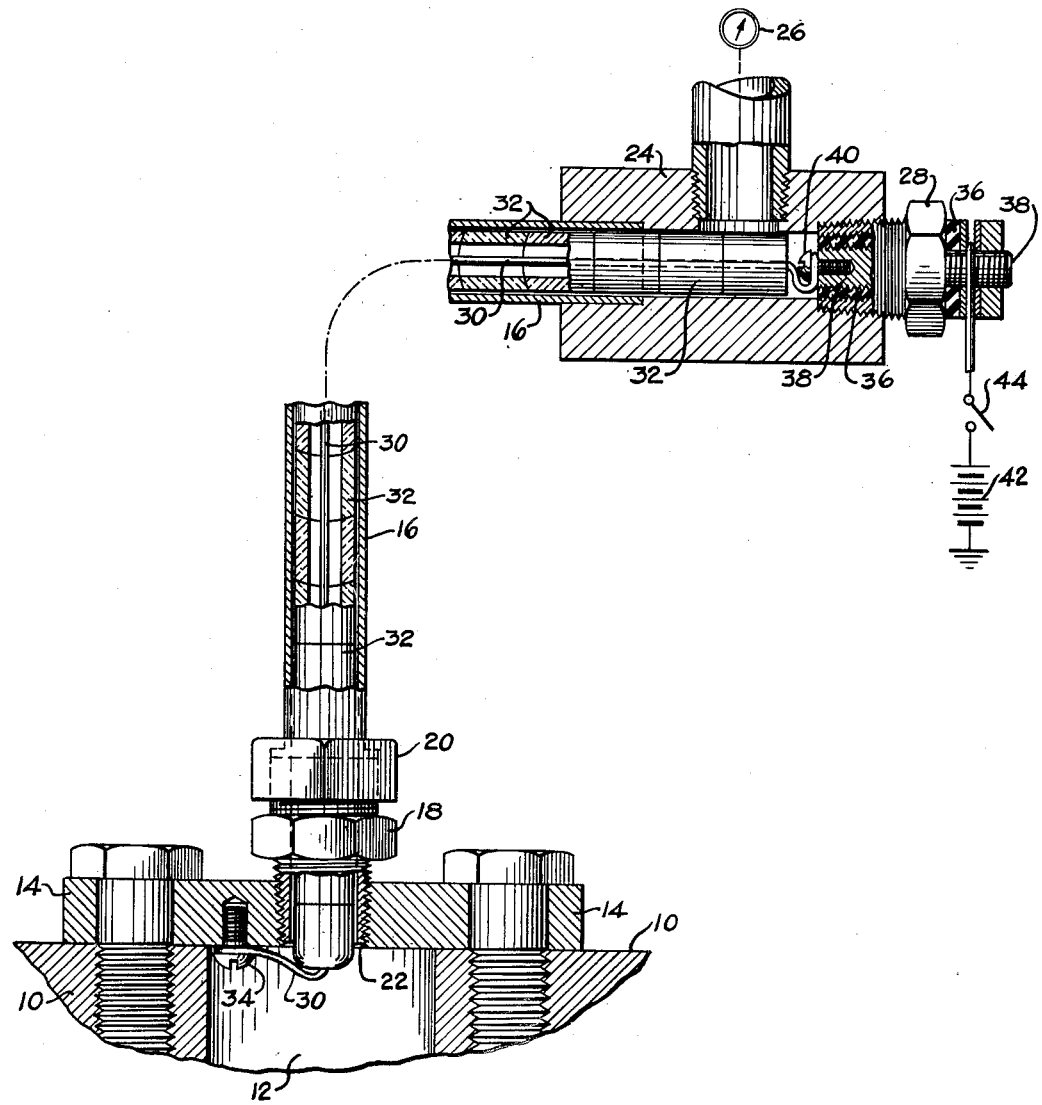

2,599,671

UNITED STATES PATENT OFFICE 2,599,671

FLUID CONDUIT HEATING MEANS

Richard A. Thompson, West Orange, N. J., assignor to Curtiss-Wright Corporation, a corporation of Delaware Application December 7, 1946, Serial No. 714,887

1 Claim. (Cl. 73—432)

This invention relates to fluid pressure transmitting means and is more particularly directed to means for preventing congealing of the fluid to be transmitted.

As pointed out in Patent No. 2,375,096, aircraft engines are generally provided with hydraulic torque meters whereby an engine oil pressure, proportional to the engine torque, is transmitted from, and exteriorly of, the engine to an indicating instrument within the aircraft. Because of the low temperatures existing at high altitudes, it has been found that the engine oil congeals in the line between the engine and the indicating instrument thereby rendering the instrument inoperative. The aforementioned patent provides a flexible rubber-like diaphragm separating engine oil from a lighter oil which transmits the torque meter pressure to the indicating instrument. However, difficulty has been experienced with this diaphragm structure because, in order to insure against failure of the diaphragm, it was found necessary to use a heavy or thick diaphragm with the result that the diaphragm introduced unpredictable errors in the system.

An object of the present invention comprises the provision of a fluid pressure transmitting system eliminating the aforementioned difficulties encountered in the prior practice. Specifically, the invention comprises the provision of novel means for heating the liquid within a liquid pressure line in order to prevent congealing of the liquid.

Other objects of the invention will become apparent upon reading the annexed detailed description in connection with the drawing.

Referring to the drawing, reference numeral 10 indicates a portion of the crankcase of an internal combustion engine having a passage 12 therein to which engine lubricating oil is supplied at a pressure proportional to the engine torque as disclosed in the aforementioned Patent No. 2,375,096. A cover plate 14 is bolted or otherwise secured to the exterior surface of the crankcase over the passage 12. A conduit 16 is secured to a fitting 18 by a nut 20, the fitting 18 being threaded in a bore 22 extending through the cover plate 14 and communicating with the crankcase passage 12. The conduit 16 extends back from, and exteriorly of, the engine to one side of a T-connection 24 to which the conduit 16 may be secured, for example, by soldering or brazing. The conduit 16 is long enough so that the T-connection 24 is in a region of warm temperature. A pressure responsive indicating instrument is connected to the end of the T-connection 24 while the other side of the T-connection is closed by a plug 28 as hereinafter described.

With the structure so far described, the torque responsive engine oil pressure within the engine passage 12 is transmitted to the pressure indicating instrument 26 by the oil within the conduit 16. In the usual aircraft engine installation, the conduit 16 extends back from the nose or front end of the engine and, therefore, is subjected to the cooling air flow over the engine. Accordingly, the temperature of the air flowing over the conduit 16 may be as low as —70° F. In the present invention, in order to prevent the oil from congealing within the conduit 16, an electric heating means is disposed therein.

The electric heating means within the conduit 16 comprises a wire 30 strung through suitable cylindrical beads 32 disposed in end-to-end relation within the conduit 16. The beads 32 are made of suitable ceramic or other electric insulating material and they have an outer diameter slightly less than the inner diameter of the conduit 16 whereby the beads 32 fit loosely therein. The beads 32 are hollow and they have an inner diameter substantially larger than the outer diameter of the wire 30 strung therethrough. The wire 30 extends through the fitting 18 into the engine passage 12 and is grounded to the engine crankcase by the screw 34. As illustrated, the wire 30 bends radially outwardly around the end bead 32 to the screw 34 thereby retaining the beads 32 within the conduit 16 and fitting 18.

The pipe plug 28 is hollow and is provided with an insulating sleeve 36 threaded therein and through which a metallic terminal 38 is threaded. The end of the wire 30, remote from the engine 10, is secured to the terminal 38 by a screw 40. The terminal 38 is connected to a suitable source of electric energy 42 through a switch 44. With this construction, when the switch 44 is closed, the electric current flowing through the wire 30 heats the wire and the surrounding oil thereby keeping the oil warm at least in the center of the conduit 16 whereby pressure variations in the engine passage 12 are readily transmitted by oil in the conduit 16 to the pressure indicating instrument 26.

As disclosed, the heater wire 30 extends into the engine passage 12 to the terminal 34 thereby also preventing congealing of the oil in the passage 12 at the surface of the engine crankcase 10 as a result of heat transfer to low temperature air flowing over the crankcase.

Preferably, one end of each bead 32 has a convex spherical surface and its other end has a concave spherical surface of similar radius of curvature. With this construction, the beads can be arranged in a nested end-to-end relation in spite of bends of the conduit 16 thereby insulating the entire length of the wire 30 from contact with the walls of the conduit 16.

The amount of heat required per unit length of conduit 16 depends primarily on the minimum surrounding air temperature to be encountered. In a satisfactory aircraft engine torque meter installation designed for operation at temperatures as low as −70° F., the conduit 16 comprised $\frac{5}{16}''$ tubing having an internal diameter of .238'', the beads 32 had an outer diameter of .23'' and an internal diameter of .10'', and the wire 30 was made of "Nichrome" having an outer diameter of .02''. The voltage of the source of electric energy 42 was sufficient to cause a current of three amperes to flow through the wire 30. With such an installation, sufficient heat is given off by the wire 30 to keep fluid, at least a central portion of the oil in the conduit 16, and in view of the substantial clearance between the wire 30 and the internal diameter of the beads 32, pressure variations in the passage 12 are readily transmitted to the indicating instrument 26. In addition, it should be clear that the invention is of general application and is not limited to use in connection with a torque meter pressure line for an aircraft engine. Obviously, the magnitude and dimensions of the aforementioned factors are subject to considerable variation and the invention is not limited to the values stated.

Engine oil has very good heat insulating properties so that, although the temperature outside the conduit 16 may be sufficiently cold that the oil congeals adjacent the wall of the conduit, only a small amount of heat given off by the wire 30 is required to keep the oil fluid about the wire 30. In addition, because of the heat insulating properties of engine oil, the outside surface of the conduit 16 never gets very much warmer than the surrounding temperature so that the system does not constitute a fire hazard. Also, therefore, no heat insulation is needed about the exterior of the conduit 16.

For reasons of clarity, in the drawing the wire 30 is illustrated as being secured under the head of a screw 40. However, as illustrated, this exposes a substantial length of wire to contact with the grounded T-connection 24. Preferably, the wire 30 is extended axially into a hole in center of the terminal 38 in which it is soldered, thereby permitting the beads 32 to better shield the wire at this point from contact with the walls of the T-connection 24. Obviously, various arrangements may be used to extend the electric circuit from the wire 30 through the plug 28 without grounding the circuit at this point but the particular manner in which this is accomplished forms no part of the present invention.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

In combination; an engine having an oil pressure passageway therein providing a source of oil pressure; pressure responsive indicating means disposed at a point remote from said engine; and means for transmitting oil pressure from said engine passageway to said indicating means, said pressure transmitting means comprising a conduit having at least one bend and disposed exteriorly of said engine and having one end communicating with said engine passageway and having its other end communicating with said indicating means, a plurality of hollow beads of insulating material disposed in end-to-end relation in said conduit, an electrical conducting resistance wire extending through said beads and into said engine passageway, said wire having a diameter substantially smaller than the internal diameter of said hollow beads to permit the transmission of oil pressure through the hollow interior of said beads, and electrical terminal means connected to the ends of said wire, and extending exteriorly of said conduit, at least one of said terminal means being insulated from said conduit.

RICHARD A. THOMPSON.

REFERENCES CITED

The following references are of record in the file of this patent:

UNITED STATES PATENTS

| Number | Name | Date |
|---|---|---|
| 2,306,831 | Proctor | Dec. 29, 1942 |

FOREIGN PATENTS

| Number | Country | Date |
|---|---|---|
| 818,914 | France | Oct. 6, 1937 |